J. C. POLE.
VACUUM ELECTRIC APPARATUS.
APPLICATION FILED JUNE 19, 1913.
1,307,455.
Patented June 24, 1919.
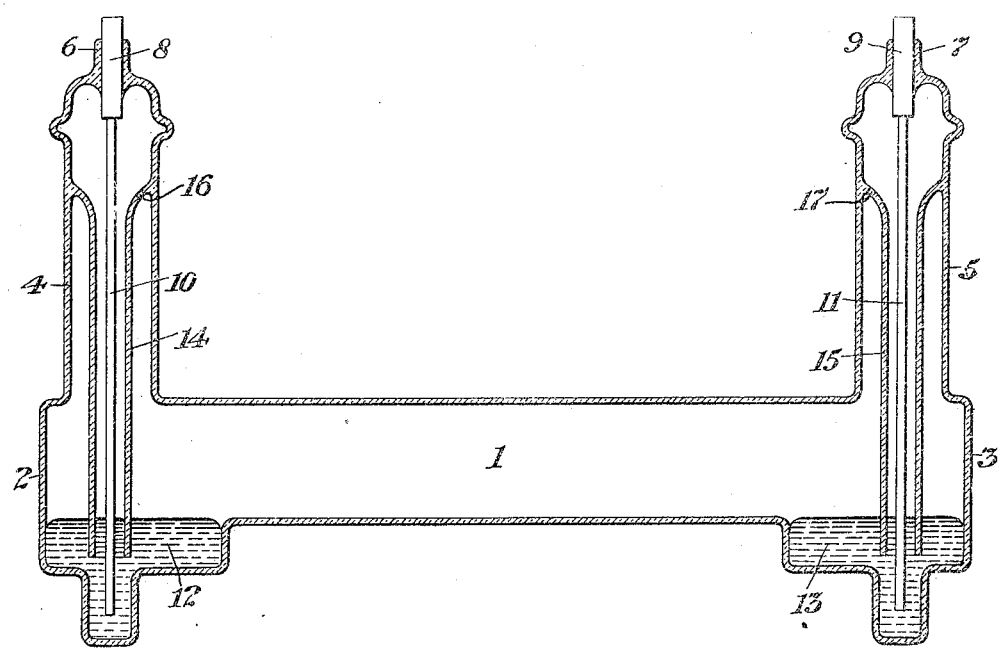

UNITED STATES PATENT OFFICE.

JOSEPH C. POLE, OF NEW YORK, N. Y., ASSIGNOR TO COOPER HEWITT ELECTRIC COMPANY, OF HOBOKEN, NEW JERSEY, A CORPORATION OF NEW JERSEY.

VACUUM ELECTRIC APPARATUS.

1,307,455.  Specification of Letters Patent.  Patented June 24, 1919.

Application filed June 19, 1913. Serial No. 774,507.

*To all whom it may concern:*

Be it known that I, JOSEPH C. POLE, a subject of the Emperor of Austria, and resident of New York, county of New York, State of New York, have invented certain new and useful Improvements in Vacuum Electric Apparatus, of which the following is a specification.

Vacuum arc lamps with containers of very refractory glass in the art known as the "quartz lamp art" have generally to withstand very high temperatures. The electrodes, one or both, may be of metals or mixtures of metals which are solid, liquid or semi-liquid at ordinary room temperatures. Should the electrodes, or at least the cathode, be of mercury, the high temperature is usually due to the container's being operated under a very high vapor pressure in order to raise the efficiency of the lamp. It may happen that when some other metal besides mercury is used for the cathode, high temperatures may occur in the container at low vapor pressures, since the high vaporizing point of the metal itself may require a higher temperature of the electrodes, or at least of the cathode, in order to maintain the vaporization necessary for carrying current in the electric path.

It has been proposed to provide vacuum containers for this kind of apparatus with platinum tube seals and in some instances, when mercury is the substance employed for the cathode, it has been proposed to protect the seals against coming into contact with the mercury, which is done by covering the inside of the seal with a suitable compound. With other metals than mercury used as electrodes, it is often necessary to protect the seal not only against coming into contact with the molten metal of the electrode but also against being heated above a certain critical point. Otherwise the seal may crack by being overheated when the lamp is operating or by the contraction of the metal when the current is turned off and the lamp is allowed to cool while the molten metal solidifies.

The present invention relates to means whereby the seal joint is kept out of the region of the greatest heat and out of contact with the molten metal of the electrode.

In the illustration accompanying this specification is shown a vertical section of a quartz lamp embodying the inventive idea above mentioned.

In the drawing, 1 indicates the luminous part of a vacuum container, which may be a container for a direct current mercury vapor lamp; 2 and 3 the electrode chambers; 4 and 5 small upright tubes having seal joints, 6 and 7. Leading-in wires, 8 and 9, preferably in the form of tubes, are fused to the tubes 4 and 5.

At 10 and 11 I show electrical conductors fused or otherwise electrically connected to the leading-in wires or tubes 8 and 9, while 12 and 13 are metals or mixtures of metals having the quality of being liquid or semi-liquid at ordinary room temperatures. These elements constitute the electrodes of the lamp. Surrounding the conductors 10 and 11 are narrow insulating tubes, preferably made of the same refractory glass as the vacuum container. The wires 10 and 11 reach below the level of the metal forming the electrodes, and the surrounding insulating tubes 14 and 15 also extend below the electrode level, while leaving the ends of the wires 10 and 11 free, so as to insure perfect electrical contact between them and the electrode metal. Small holes 16 and 17 are suitably provided in the insulating tubes 14 and 15 in order to allow the container to be perfectly evacuated on the pump and also to provide for the ultimate free distribution of the heat through the different parts of the lamp.

In this new way of making and locating the seals, they are not exposed to the full temperature of the electrode metal in the running lamp, as is the case in the lamps previously referred to except for the protection provided by the compound employed. Neither is there in the novel construction proposed by me any liberation of gases from a compound, such as is liable to occur when such compound is used, to the impairment of the vacuum of the container.

In my arrangement the leading-in wires 10 and 11 alone are in direct contact with the electrode metal. The seal joints 6 and 7 are outside the region of the hot metal forming the electrode, and if the upright tubes 4 and 5 are made long enough the joints may be kept reasonably cool.

Owing to the presence of the insulating tubes 14 and 15 surrounding the leading-in wires 10 and 11, the tendency is avoided of the so-called cathode spot to creep up the electrical conductor (10 or 11 as the case may be) connected with the cathode and thereby heat the conductor excessively and possibly cause the destruction thereof or the liberation of deleterious gases. The metallic wire submerged below the surface of the cathode is protected by the insulating tube 14 or 15. Nevertheless the said tubes do not interfere with the formation of good electrical contact between the leading-in conductor and the electrode metal.

I claim as my invention:—

1. In a vapor electric lamp, a container of highly refractory glass, liquid metallic electrodes and chambers wherein they are located, leading in conductors extending into the liquid electrodes and surrounded by interior tubes out of contact throughout their length with said conductors, and tubular seals for the said leading in conductors remote from the region of the heated metal into which said conductors extend.

2. In a vapor electric lamp, a container of highly refractory glass, liquid metallic electrodes and chambers containing the same, in combination with tubular seals for the electrodes remote from the region of the heat produced at the electrodes, and means for protecting the seals from exposure to the vapor liberated during the operation of the lamp, consisting of interior tubes surrounding the leading-in conductors and out of contact therewith.

3. In a vapor electric lamp, a container of highly refractory glass, a luminous portion, electrode chambers mounted thereon, and liquid metallic electrodes in said chambers, in combination with upright insulating tubes extending above said chambers, seals for said tubes comprising in part suitable metals, extensions of the said metallic parts to the electrodes, and inner upright tubes closely surrounding the said extensions and out of contact therewith, the said extensions and their immediate surrounding tubes extending into the substance of the electrodes, whereby good electrical contact is secured and the seals are protected from being exposed to the vapor liberated during the operation of the lamp.

4. In a container for a vapor lamp of highly refractory glass, a luminous portion, electrode chambers surrounding the same at the ends thereof, liquid metallic electrodes suitably supported underneath the said chambers in combination with upright insulating tubes extending above the said electrodes, seals for the said tubes remote from the heated region of the electrodes, the said seals comprising in part suitable metals, extensions of the said metallic parts to the electrodes and inner upright tubes closely surrounding the said extensions and out of contact therewith, the said extensions and their immediate surrounding tubes extending into the substance of the electrodes, whereby good electrical contact is secured, and the seals are protected from being unduly exposed to the vapor liberated during the operation of the lamp.

Signed at New York in the county of New York and State of New York this 16th day of June, A. D. 1913.

JOSEPH C. POLE.

Witnesses:
 WM. H. CAPEL,
 THOS. H. BROWN.